United States Patent
Yang

(10) Patent No.: US 11,049,231 B2
(45) Date of Patent: Jun. 29, 2021

(54) FACE IMAGE PROCESSING METHOD, DEVICE AND APPARATUS, AND COMPUTER-READABLE STORAGE MEDIUM

(71) Applicant: BEIJING XIAOMI MOBILE SOFTWARE CO., LTD., Beijing (CN)

(72) Inventor: Song Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 61 days.

(21) Appl. No.: 16/428,502

(22) Filed: May 31, 2019

(65) Prior Publication Data

US 2019/0385290 A1 Dec. 19, 2019

(30) Foreign Application Priority Data

Jun. 15, 2018 (CN) .......................... 201810621412.5

(51) Int. Cl.
*G06K 9/00* (2006.01)
*G06T 5/50* (2006.01)
*G06T 5/00* (2006.01)

(52) U.S. Cl.
CPC ............ *G06T 5/50* (2013.01); *G06K 9/00281* (2013.01); *G06T 5/009* (2013.01); *G06T 2207/20208* (2013.01); *G06T 2207/20221* (2013.01); *G06T 2207/30201* (2013.01)

(58) Field of Classification Search
CPC ....................................................... G06T 5/50
See application file for complete search history.

(56) References Cited

U.S. PATENT DOCUMENTS

| | | | | |
|---|---|---|---|---|
| 2013/0076773 | A1* | 3/2013 | Chen | G06T 11/206 345/589 |
| 2013/0216154 | A1 | 8/2013 | Li et al. | |
| 2013/0236091 | A1* | 9/2013 | Ubillos | H04N 9/70 382/163 |
| 2017/0076474 | A1* | 3/2017 | Fu | G06K 9/00268 |
| 2017/0262970 | A1 | 9/2017 | Chen et al. | |
| 2018/0061009 | A1* | 3/2018 | Gren | G06T 5/50 |
| 2018/0174370 | A1* | 6/2018 | Chen | G06T 15/005 |

OTHER PUBLICATIONS

Extended European search report of counterpart EP application No. 19174538.9 dated Oct. 29, 2019.
Abdulla Fakhro et al: "The Evolution of Looks and Expectations of Asian Eyelid and Eye Appearance", Seminars in Plastic Surgery, vol. 29, No. 03, Aug. 13, 2015 (Aug. 13, 2015), pp. 135-144, XP055633772, ISSN: 1535-2188, DOI: 10.1055/s-0035-1556847; "Aegyo-sal: lower eyelid love band"; pp. 141-p. 142; figures 11,12.

* cited by examiner

*Primary Examiner* — Oneal R Mistry
(74) *Attorney, Agent, or Firm* — Syncoda LLC; Feng Ma

(57) ABSTRACT

A face image processing method includes: extracting a first image to be processed which includes an under-eye bag area in the face image; performing under-eye bag removal on the first image to be processed to obtain a first target image; extracting a second image to be processed which includes a lying silkworm area in the face image; acquiring a lying silkworm mask map according to the second image to be processed; and fusing the first target image with the face image by using the lying silkworm mask map to obtain a target face image.

17 Claims, 9 Drawing Sheets

FACE IMAGE PROCESSING METHOD, DEVICE AND APPARATUS, AND COMPUTER-READABLE STORAGE MEDIUM

CROSS-REFERENCE TO RELATED APPLICATION

This application claims priority to Chinese Patent Application No. 201810621412.5, filed on Jun. 15, 2018, the disclosure of which is incorporated herein by reference in its entirety.

BACKGROUND

With the development of image processing technology, human face images are processed more and more commonly with beauty technology.

In the related art, when the under-eye bag in the human face image is removed with the beauty technology, the brightness of the area under the eyes in the human face image is adjusted, for example, the brightness of the under-eye bag area in the human face image is increased, so that the brightness of the area under the eyes becomes even. Thereby, the human face image with removed under-eye bag is obtained.

SUMMARY

The present disclosure relates to the field of image processing, and more particularly to a human face image processing method, device and apparatus and a readable storage medium.

In an aspect, there is provided a method for processing a human face image, comprising:

extracting a first image to be processed which includes an under-eye bag area in the human face image;

performing under-eye bag removal on the first image to be processed to obtain a first target image;

extracting a second image to be processed which includes a lying silkworm area in the human face image;

acquiring a lying silkworm mask map according to the second image to be processed; and fusing the first target image with the human face image by using the lying silkworm mask map to obtain a target human face image.

In some embodiments, acquiring a lying silkworm mask map according to the second image to be processed includes:

acquiring a reference mask map which is used to indicate a lying silkworm area in the second image to be processed;

performing grayscale adjustment on the second image to be processed to obtain a reference grayscale image; and superimposing the reference mask map and the reference grayscale image to obtain the lying silkworm mask map.

In some embodiments, performing grayscale adjustment on the second image to be processed to obtain a reference grayscale image includes:

performing grayscale processing on the second image to be processed;

acquiring pixel values of respective pixel points in the second image to be processed after the grayscale processing;

converting the pixel value of each of the respective pixel points by using an s-type function to obtain the reference grayscale image, where the s-type function is $$p_{out} = \frac{255}{1+e^{-t}};$$

wherein, $p_{out}$ is a pixel value of the $i^{th}$ pixel point in the reference grayscale image, $$t = \frac{k \times (p_{in} - h)}{255},$$

k is a slope parameter of the s-type function, and the greater the slope parameter is, the steeper the curve corresponding to the s-type function is, $p_{in}$ is a pixel value of the $i^{th}$ pixel point in the second image to be processed after the grayscale processing, $1 \leq i \leq n$, n is the total number of the pixel points in the second image to be processed, h is a conversion threshold which is used to indicate brightness of the human face image.

In some embodiments, the method further includes:

acquiring, in the first image to be processed, a plurality of brightness values of a plurality of sampled pixel points located at an edge of the under-eye bag area;

determining, according to the plurality of brightness values, an average brightness value of the plurality of sampled pixel points; and determining the average brightness value as the conversion threshold.

In some embodiments, performing under-eye bag removal on the first image to be processed to obtain a first target image includes:

performing brightness adjustment on the first image to be processed to obtain a first auxiliary image;

acquiring an under-eye bag mask map corresponding to the first image to be processed, the under-eye bag mask map being used to indicate the under-eye bag area in the first image to be processed; and fusing the first image to be processed with the first auxiliary image according to the under-eye bag mask map to obtain the first target image.

In some embodiments, the method further includes:

performing face key point positioning on the human face image to determine an eye contour in the human face image, the eye contour comprising an upper eyelid line and a lower eyelid line; and determining a preset area of the lower eyelid line in the human face image away from one side of the upper eyelid line as the under-eye bag area, the lower eyelid line being located at an edge of the under-eye bag area.

In some embodiments, performing brightness adjustment on the first image to be processed includes:

performing the brightness adjustment on the first image to be processed according to at least one of a contrast adjustment mode, an optional color mode, and a soft light processing mode; and fusing the first image to be processed with the first auxiliary image includes:

performing Poisson fusion of the first image to be processed and the first auxiliary image.

In some embodiments, fusing the first target image with the human face image includes:

performing Alpha fusion of the first target image and the human face image.

In another aspect, there is provided a device for processing a human face image, including:

a first extracting module configured to extract a first image to be processed which includes an under-eye bag area in the human face image;

an under-eye bag removal module configured to perform under-eye bag removal on the first image to be processed to obtain a first target image;

a second extracting module configured to extract a second image to be processed which includes a lying silkworm area in the human face image;

a first acquiring module configured to acquire a lying silkworm mask code image according to the second image to be processed; and a fusing module configured to fuse the first target image with the human face image by using the lying silkworm mask map to obtain a target human face image.

In some embodiments, the first acquiring module includes:

a first acquiring sub-module configured to acquire a reference mask map which is used to indicate a lying silkworm area in the second image to be processed;

a grayscale adjustment sub-module configured to perform grayscale adjustment on the second image to be processed to obtain a reference grayscale image; and a superimposing sub-module configured to superimpose the reference mask map and the reference grayscale image to obtain the lying silkworm mask map.

In some embodiments, the grayscale adjustment sub-module is further configured to:

perform grayscale processing on the second image to be processed;

acquire pixel values of respective pixel points in the second image to be processed and applied with the grayscale processing;

convert the pixel value of each of the respective pixel points by using an s-type function to obtain the reference grayscale image, where the s-type function is:

$$p_{out} = \frac{255}{1+e^{-t}};$$

wherein, p out is a pixel value of the $i^{th}$ pixel point in the reference grayscale image, $$t = \frac{k \times (p_{in} - h)}{255},$$

k is a slope parameter of the s-type function, and the greater the slope parameter is, the steeper the curve corresponding to the s-type function is, $p_{in}$ is a pixel value of the $i^{th}$ pixel point in the second image to be processed after the grayscale processing, 1≤i≤n, n is the total number of the pixel points in the second image to be processed, h is a conversion threshold which is used to indicate brightness of the human face image.

In some embodiments, the device for processing a human face image further includes:

a second acquiring module configured to acquire, in the first image to be processed, a plurality of brightness values of a plurality of sampled pixel points located at an edge of the under-eye bag area;

a first determining module configured to determine, according to the plurality of brightness values, an average brightness value of the plurality of sampled pixel points; and a second determining module configured to determine the average brightness value as the conversion threshold.

In some embodiments, the under-eye bag removal module includes:

a brightness adjustment sub-module configured to perform brightness adjustment on the first image to be processed to obtain a first auxiliary image;

a second acquiring sub-module configured to acquire an under-eye bag mask map corresponding to the first image to be processed, the under-eye bag mask map being used to indicate the under-eye bag area in the first image to be processed; and a fusing sub-module configured to fuse the first image to be processed with the first auxiliary image according to the under-eye bag mask map to obtain the first target image.

In some embodiments, the device for processing a human face image further includes:

a positioning module configured to perform face key point positioning on the human face image to determine an eye contour in the human face image, the eye contour comprising an upper eyelid line and a lower eyelid line; and a third determining module configured to determine a preset area of the lower eyelid line in the human face image away from one side of the upper eyelid line as the under-eye bag area, the lower eyelid line being located at an edge of the under-eye bag area.

In some embodiments, the brightness adjustment sub-module is further configured to:

perform the brightness adjustment on the first image to be processed according to at least one of a contrast adjustment mode, an optional color mode, and a soft light processing mode; and the fusing sub-module is further configured to:

perform Poisson fusion on the first image to be processed and the first auxiliary image.

In some embodiments, the fusing module is further configured to:

perform Alpha fusion of the first target image and the human face image.

In yet another aspect, there is provided an apparatus for processing a human face image, comprising:

a processing component; and a memory for storing instructions executable by the processing component;

wherein the processing component is configured to:

extract a first image to be processed which includes an under-eye bag area in the human face image;

perform under-eye bag removal on the first image to be processed to obtain a first target image;

extract a second image to be processed which includes a lying silkworm area in the human face image;

acquire a lying silkworm mask map according to the second image to be processed; and fuse the first target image with the human face image by using the lying silkworm mask map to obtain a target human face image.

In still yet another aspect, there is provided a non-transitory computer-readable storage medium having stored therein instructions that, when executed by a processing component, causes the processing component to perform the method for processing the human face image comprising:

extracting a first image to be processed which includes an under-eye bag area in the human face image;

performing under-eye bag removal on the first image to be processed to obtain a first target image;

extracting a second image to be processed which includes a lying silkworm area in the human face image;

acquiring a lying silkworm mask map according to the second image to be processed; and fusing the first target image with the human face image by using the lying silkworm mask map to obtain a target human face image.

In another aspect, a mobile terminal is provided including the device described above, and further including a microphone and a speaker.

In some embodiments, the mobile terminal is a mobile phone.

In some embodiments, the processor is a general-purpose processor, such as central processing unit (CPU) of the mobile phone, which is configured to not only realize the methods described above but also run programs or applications (Apps) on the mobile phone, such as browsing, gaming, video/textual/voice communications, etc.

In some other embodiments, the processor is an ASIC described above.

In some embodiments, the human face image processing device is integrated with the mobile phone; in some other embodiments, the device can be a plug-and-play device for the mobile phone, and can access and be controlled by the programs/apps/instructions stored on the phone. In some implementations, the device can draw power from the phone. In some other implementations, the device can have its own battery.

In some embodiments, the mobile phone further includes a micro-electro-mechanical systems (MEMS) motion sensor configured to sense an attitude of the mobile phone, to facilitate a face image processing method.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of the present disclosure, illustrate embodiments consistent with the disclosure and, together with the description, serve to explain the principles of the disclosure.

DETAILED DESCRIPTION

Reference will now be made in detail to some embodiments, examples of which are illustrated in the accompanying drawings. The following description refers to the accompanying drawings in which the same numbers in different drawings represent the same or similar elements unless otherwise represented. The implementations set forth in the following description of some embodiments do not represent all implementations consistent with the disclosure. Instead, they are merely examples of apparatuses and methods consistent with aspects related to the disclosure as recited in the appended claims.

The inventors of the present application have recognized that, when the under-eye bag in the human face image is removed, other features (such as lying silkworm) in the area under the human eyes in the human face image are also removed together, and thus the effect of beauty treatment of the human face image is poor.

In the human face image processing method, the lying silkworm mask map can be obtained according to the second image to be processed which includes the lying silkworm area, and the lying silkworm mask map is used to fuse the first target image after the under-eye bag removal processing with the human face image to obtain a target human face image. The first target image is obtained through Poisson fusion of the first image to be processed and the first auxiliary image, and the target human face image is obtained by Alpha fusing the first target image and the human face image.

Therefore, the under-eye bag area in the target human face image has no obvious boundary with the surrounding area, and the lying silkworm in the target human face image can be more clearly displayed. Therefore, the beauty effect on the human face image is better.

With the development of image processing technology, the human face image is processed by the beauty technology when the human face image is shot. For example, under-eye bag removal can be performed to the human face image, and removing under-eye bag is also called removing dark circles. Usually, when the under-eye bag in the human face image is removed, the lying silkworm under the human eye is also removed. As a result, the human eye lacks stereoscopic impression, and the human face image has a poor beauty treatment effect. In the human face image processing method provided by the embodiment of the present disclosure, the lying silkworm can be preserved when the under-eye bag in the human face image is removed, thereby improving the beauty treatment effect of the human face image.

Figure 1:
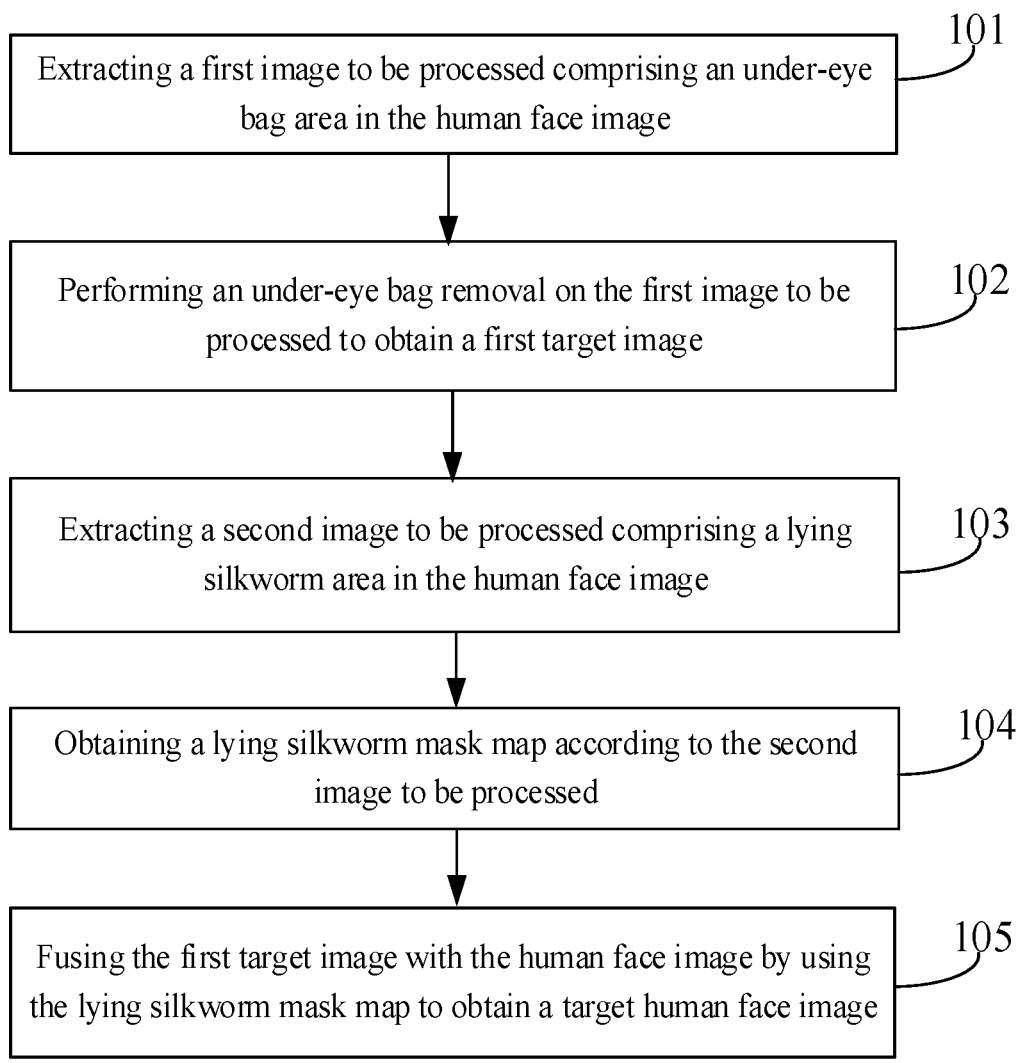
FIG. 1 is a flow chart showing a method for processing a human face image according to some embodiments.

FIG. 1 is a flowchart of a method for processing human face image according to some embodiments. The method can be applied to a device for processing human face image. As shown in FIG. 1, the method for processing human face image may comprise:

In step 101, a first image to be processed comprising an under-eye bag area in the human face image is extracted;

In an example, the under-eye bag area may be an area where the under-eye bag is preset in the human face image. In some embodiments, the under-eye bag area may be an actual area of the under-eye bag in the human face image, or the under-eye bag area may include: an actual area of the under-eye bag in the human face image, and a partial area around the actual area of the under-eye bag.

In step 102, an under-eye bag removal is performed on the first image to be processed to obtain a first target image;

In step 103, a second image to be processed comprising a lying silkworm area in the human face image is extracted;

In an example, the lying silkworm area may be the area where the preset lying silkworm in the human face image is located. In some embodiments, the lying silkworm area may be the actual area of the lying silkworm in the human face image, or the lying silkworm area may include: the actual area of the lying silkworm in the human face image, and the partial area around the actual area of the lying silkworm.

In step 104, a lying silkworm mask map is obtained according to the second image to be processed;

In step 105, the first target image is fused with the human face image by using the lying silkworm mask map to obtain a target human face image.

In some embodiments, the lying silkworm mask map is used to indicate an area (such as a lying silkworm area) in the human face image that needs to be processed. The lying silkworm mask map may be a grayscale image, and the area in the human face image corresponding to the area with higher brightness in the lying silkworm mask map is changed to a greater extent, and the area in the human face image corresponding to the area with lower brightness in the lying silkworm mask map is changed to a lesser extent or may not be changed.

As such, in the human face image processing method provided by the embodiment of the present disclosure, the lying silkworm mask map can be obtained according to the second image to be processed comprising the lying silkworm area, and the lying silkworm mask map is used to merge a first target image after under-eye bag removal processing with the human face image to obtain a target human face image. In this way, when the human face image is subject to the beauty treatment, only the under-eye bags are removed, and at the same time, the lying silkworm features of the under-eye bag area are preserved. Therefore, the beauty effect on the human face image is better.

Figure 2:
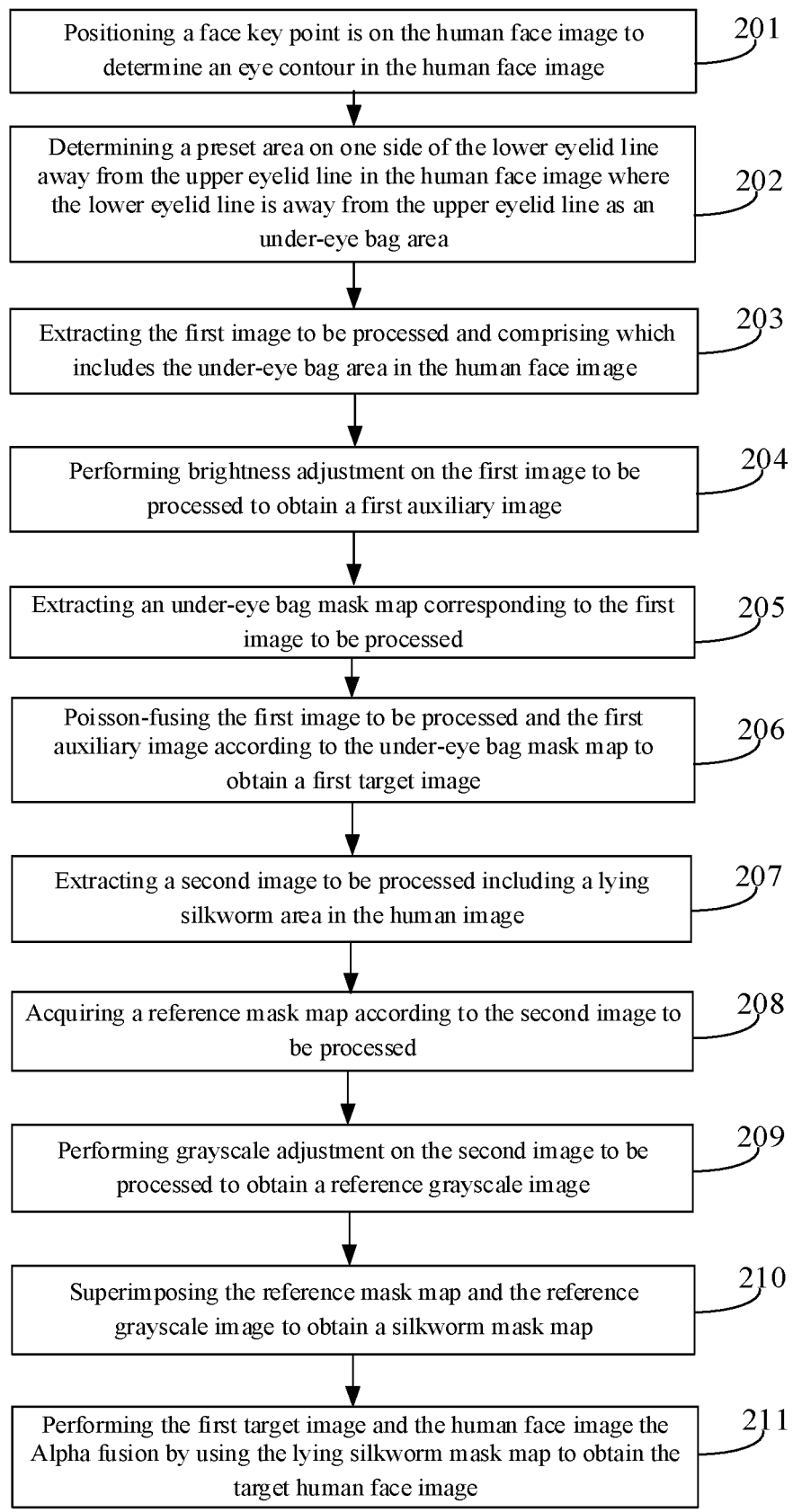
FIG. 2 is a flow chart showing another method for processing a human face image according to some embodiments.

FIG. 2 is a flowchart of another method for processing the human face image according to some embodiments. The method can be applied to a device for processing the human face image. As shown in FIG. 2, the method for processing the human face image may comprise:

In step 201, a face key point is positioned on the human face image to determine an eye contour in the human face image.

The face key points in the human face image may include: a plurality of feature points constituting at least one of a face contour, an eye contour, an eyebrow contour, a lip contour, and a nose contour, and the face key point positioning is the technology of determining the plurality of feature points based on face detection (that is, detecting whether a face is included in the image).

Figure 3:
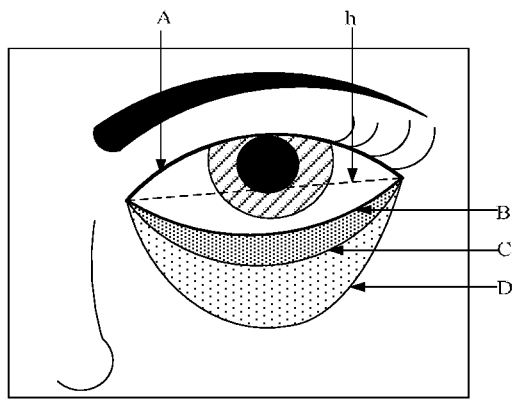
FIG. 3 is a schematic diagram illustrating part of a human face image according to some embodiments.

In some embodiments, when an image acquisition component of a terminal acquires an image, a device for processing the human face image may perform face detection on the image and may determine the image as a human face image when determining that the image includes a human face. Then, the device for processing the human face image may perform face key point positioning on the human face image to determine an eye contour in the human face image, and the eye contour may be surrounded by an upper eyelid line and a lower eyelid line. In some embodiments, FIG. 3 shows a schematic diagram of a partial human face image including an eye contour, wherein the eye contour may be surrounded by an upper eyelid line A and a lower eyelid line B.

In step 202, a preset area on one side of the lower eyelid line away from the upper eyelid line in the human face image is determined as an under-eye bag area.

The device for processing the human face image may determine the under-eye bag area and the lying silkworm area in the human face image according to the eye contour determined in step 201. A first preset area on one side of the lower eyelid line away from the upper eyelid line in the human face image may be an under-eye bag area, and the second preset area on one side of the lower eyelid line away from the upper eyelid line can be a lying silkworm area, and the first preset area may include the second preset area. In addition, the lower eyelid line may be located at the edge of the under-eye bag area, and the lower eyelid line may also be located at the edge of the lying silkworm area. In some embodiments, please continue to refer to FIG. 3, the under-eye bag area may be: a first preset area surrounded by a lower eyelid line B and an arc D on a side of the lower eyelid line B away from the upper eyelid line A. The lying silkworm area may include a second preset area surrounded by the lower eyelid line B and an arc C located on a side of the lower eyelid line B away from the upper eyelid line A.

It should be noted that both the shape and size of the under-eye bag area and the lying silkworm area can be related to the lower eyelid line B. In different human face images, both the shape and size of the under-eye bag area and the under-eye bag area are also different. It is assumed that the two end points of the line segment h in FIG. 3 are the two end points of the lower eyelid line B, and the length of the line segment h can be positively correlated with the size of the under-eye bag area and the size of the lying silkworm area. In some embodiments, the maximum distance between the point on the arc D and the line segment h may be m times of the length of the line segment h, $0.7 \leq m \leq 0.9$, and the maximum distance between the point on the arc C and the line segment h may be n times of the length of the line segment h, $0.2 \leq n \leq 0.3$.

In step 203, the first image to be processed which includes the under-eye bag area in the human face image is extracted.

After determining the under-eye bag area in the human face image, the device for processing the human face image may determine an area of the human face image where an under-eye bag removal needs to be performed according to the under-eye bag area, and the area that requires the under-eye bag removal processing includes the under-eye bag area. In some embodiments, the device for processing the human face image may extract the area that needs to be subjected to the under-eye bag removal processing from the human face image to obtain a new image (such as a first image to be processed), and the first image to be processed includes the under-eye bag area. Further, an under-eye bag removal process can be performed on the extracted first image to be processed obtained by the extraction.

In step 204, brightness adjustment is performed on the first image to be processed to obtain a first auxiliary image.

The brightness of the under-eye bag area in the human face image is usually uneven, and the brightness difference with the surrounding area is relatively large so that the under-eye bag area is more prominently displayed in the human face image. The brightness adjustment of the first image can make the brightness of the under-eye bag area in the human face image uniform, so that the under-eye bag area will not be prominently displayed in the human face image, and the effect of removing the under-eye bag in the human face image is achieved.

The device for processing the human face image may perform brightness adjustment (i.e., the under-eye bag removal) on the first image to be processed according to at least one of a contrast adjustment mode, an optional color mode, and a soft light processing mode, thereby obtaining the first auxiliary image. The brightness difference of each position in the first auxiliary image is small. Herein, the optional color mode is: only the selected color in the image is adjusted without changing other colors in the image. If the color of the under-eye bag area in the human face image is black, the black can be selected to adjust the color of all the areas in the human face image which are displayed in black. In some embodiments, when performing brightness adjustment on the first image to be processed, the device for processing the human face image can reduce the contrast of the first image to be processed, and the first image to be processed is subjected to soft light processing; or, a color of the under-eye bag area in the human face image can be selected, the color in the first image to be processed is adjusted, and the first image to be processed is subjected to a soft light processing.

It should be noted that step 204 is to adjust the brightness of the first image to be processed as a whole, that is, comparing the obtained first auxiliary image with the first image to be processed, and not only the image of the under-eye bag area is changed, but also the images of other areas other than the under-eye bag area are changed.

In step 205, an under-eye bag mask map corresponding to the first image to be processed is extracted.

The device for processing the human face image may generate an under-eye bag mask map corresponding to the first image to be processed according to the first image to be processed, and the under-eye bag mask map may be used to indicate an under-eye bag area in the first image to be processed.

Figure 4:
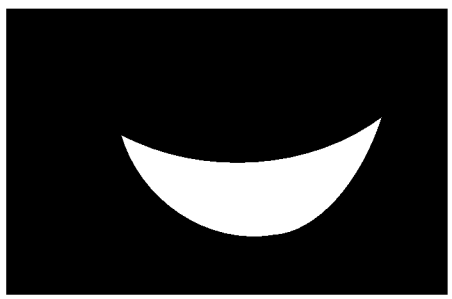
FIG. 4 illustrates a view of under-eye bag mask map according to some embodiments.

In some embodiments, the under-eye bag mask map may include a black area and a white area, the white area may have the same shape as the under-eye bag area does, and the white area may also have the same size as the under-eye bag area does. In some embodiments, the size of the under-eye bag mask map may be the same as the size of the first image to be processed, the shape of the under-eye bag mask map may be the same as the shape of the first image to be processed, and the position where the white area of the under-eye bag mask map is located may be the same as the position of the under-eye bag area in the first image to be processed. In an example, it is assumed that the first image to be processed which is extracted in step 203 is the image shown in FIG. 3, then the eye-bag mask map may be as shown in FIG. 4.

In step 206, the first image to be processed and the first auxiliary image are Poisson-fused according to the under-eye bag mask map to obtain a first target image.

In some embodiments, the device for processing the human face image performs Poisson fusion on the first image to be processed and the first auxiliary image according to the under-eye bag mask map, which is equivalent to only processing the area (i.e., the under-eye bag area) corresponding to the white area in the first image to be processed so that the first target image is obtained. In some embodiments, the image of the under-eye bag area in the first image to be processed is replaced with the image, in the first auxiliary image, of the same position as the white area, and the image of the area after the replacement is processed, so that there is no obvious boundary between the area and the surrounding area thereof.

It should be noted that the above steps 204 to 206 are steps of performing the under-eye bag removal on the first image to be processed by the device for processing the human face image. If the first target image is fused with the human face image, the obtained image is the image with the under-eye bags removed, and the lying silkworm is removed at the same time. In order to preserve the lying silkworm in the human face image, the device for processing the human face image may perform the following steps to obtain a target human face image that does not include the under-eye bag but includes the lying silkworm.

In step 207, a second image to be processed including a lying silkworm area is extracted in the human face image.

The device for processing the human face image may extract a new image (such as a second image to be processed) in the human face image while retaining the lying silkworm in the human face image, and the second image to be processed includes an area to be retained (that is, the lying silkworm area), so that the device for processing the human face image can process the second image to be processed. For the determination method of the lying silkworm area, refer to the determination method of the lying silkworm area in step 202. The embodiments of the present disclosure are not described again herein.

Figure 5:
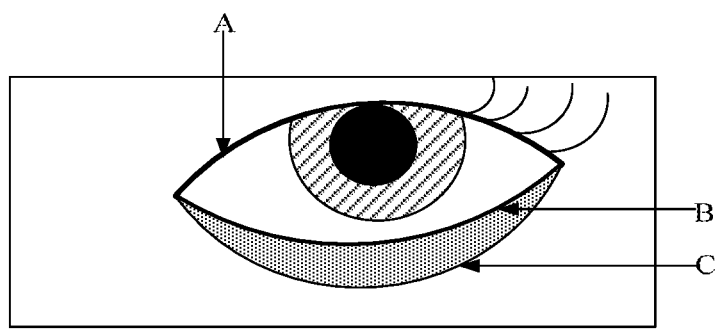
FIG. 5 illustrates a second image to be processed according to some embodiments.

In some embodiments, FIG. 5 shows a second image to be processed, and the second image to be processed includes an upper eyelid line A, a lower eyelid line B, and an arc C, and the area enclosed by the lower eyelid line B and the arc C is a lying silkworm area. In some embodiments, the size of the second image to be processed may be smaller than the first image to be processed, and the second image to be processed may be part of the first image to be processed.

In step 208, a reference mask map is acquired according to the second image to be processed.

The device for processing the human face image may generate a reference mask map according to the second image to be processed, and the reference mask map may be used to indicate a silkworm area in the second image to be processed.

Figure 6:
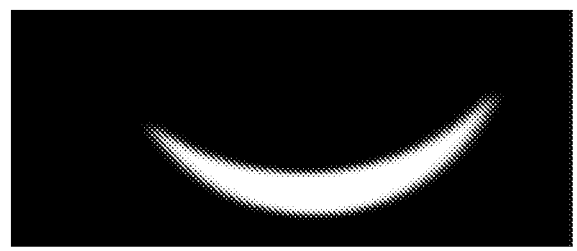
FIG. 6 illustrates a view of a reference mask map according to some embodiments.

The reference mask map may include a black area and a white area that have been subject to blurring processing. When the blurring process is not performed, the size of the white area is the same as the size of the lying silkworm area in the second image to be processed, and the white area has a shape the same as the shape of the lying silkworm area. In some embodiments, the size of the reference mask map may be the same as the size of the second image to be processed, and the shape of the reference mask map may also be the same as the shape of the second image to be processed, and the location of the white area in the reference mask map can be in the same position as the lying silkworm area in the second image to be processed. In some embodiments, if the second image to be processed is as shown in FIG. 5, the reference mask map may be the grayscale image shown in FIG. 6.

In step 209, grayscale adjustment is performed on the second image to be processed to obtain a reference grayscale image.

The device for processing the human face image may perform grayscale adjustment on the second image to be processed to increase a brightness difference between a pixel point with a higher brightness and a pixel point with a lower brightness in the second image to be processed, thereby obtaining a reference grayscale image. That is, the process performed on the second image to be processed is similar to increasing the contrast.

Figure 7:
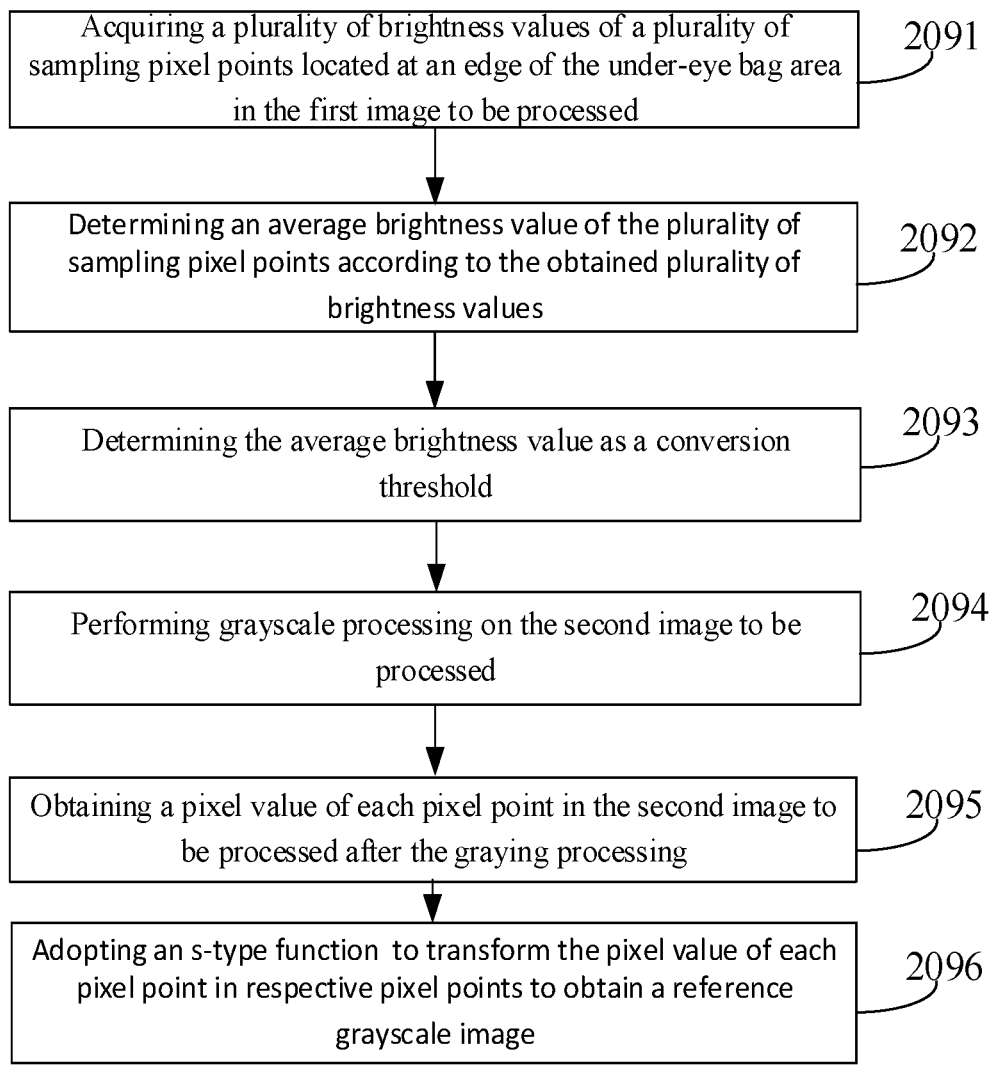
FIG. 7 is a flow chart showing a method for obtaining a reference grayscale image according to some embodiments.

In some embodiments, as shown in FIG. 7, step 209 may include:

Step 2091: a plurality of brightness values of a plurality of sampling pixel points located at an edge of the under-eye bag area in the first image to be processed are acquired.

In some embodiments, if the first image to be processed is the image shown in FIG. 3, the device for processing the human face image may perform sampling in a plurality of pixel points where the arc D is located in the image. In an example, a pixel point separated from one end point on the arc D by a preset distance is determined as one sampling pixel point, and another pixel point separated from the sampling pixel point by a preset distance is determined as another sampling pixel point, and a plurality of sampling pixel points of the edge of the under-eye bag area are determined in a similar way and a brightness value of each of the plurality of sampling pixel points is obtained.

In some embodiments, the sampling pixel point may not be the pixel point where the arc D is located, and the device for processing the human face image may randomly determine the sampling pixel point in the pixel points around the under-eye bag area. In an example, the sampling pixel point may be a pixel point around the arc D, which will not be limited in the embodiments of the present disclosure.

Step 2092: an average brightness value of the plurality of sampling pixel points is determined according to the obtained plurality of brightness values.

Step 2093, the average brightness value is determined as a conversion threshold.

The conversion threshold is used to indicate the brightness of the human face image, and the brightness of the edge of the under-eye bag area is used to represent the brightness of the human face image in the embodiments of the present disclosure. In some embodiments, the brightness of the other areas in the human face image may be used to represent the brightness of the human face image. In an example, the other area may be a cheek area or a forehead area, etc., which is not limited by the embodiments of the present disclosure. If the brightness of the cheek area represents the brightness of the human face image, the plurality of sampling pixel points in step 2091 may be multiple pixel points in the cheek area, or the plurality of sampling pixel points may include: multiple pixel points in the cheek area and multiple pixel points in the under-eye bag areas.

Step 2094: grayscale processing is performed on the second image to be processed.

In some embodiments, the device for processing the human face image performs grayscale processing on the second image to be processed, that is, converting the second image to be processed into a grayscale image.

Step 2095: a pixel value of each pixel point in the second image to be processed after the grayscale processing is obtained.

Step 2096, an s-type function is adopted to transform the pixel value of each pixel point in respective pixel points to obtain a reference grayscale image.

Herein, the s-type function is:

$$p_{out} = \frac{255}{1+e^{-t}}.$$

$p_{out}$ is the pixel value of the i-th pixel point in the reference grayscale image, $$t = \frac{k \times (p_{in} - h)}{255},$$

and k is the slope parameter of the s-type function. The bigger the slope parameter is, the steeper the curve corresponding to the s-type function is. $p_{in}$ is the pixel value of the i-th pixel point in the second image to be processed after the grayscale processing, 1≤i≤n, n is the total number of pixel points in the second image to be processed, and h is the conversion threshold. In some embodiments, the value of k can be 15.

It should be noted that the s-type function can also be called a sigmoid function. If the pixel value of the pixel point is relatively large, the pixel value of the pixel point after the s-type function conversion will be larger. If the pixel value of the pixel point is smaller, the pixel value of the pixel point after the s-type function conversion will be smaller. In some embodiments, in the second image to be processed after the grayscale processing, if a pixel point is displayed as a dark gray, the pixel point in the reference grayscale image obtained after the s-type function conversion may be displayed as black. If a pixel point is displayed as a lighter gray in the second image to be processed after the grayscale processing, the pixel may be displayed in white in the obtained reference grayscale image. In this way, the actual area of the lying silkworm in the reference grayscale image can be clearly expressed.

In step 210, the reference mask map and the reference grayscale image are superimposed to obtain a silkworm mask map.

The device for processing the human face image may first invert the reference grayscale image, that is, change the value a of the pixel point in the reference grayscale image to 255−a, and then the inversely processed reference grayscale image and the reference mask map are superimposed to obtain a silkworm mask map. If the pixel value of a pixel in the reference mask is 0, the pixel value of the pixel point becomes 255 after the inversion processing; if the pixel value of a pixel point in the reference grayscale image is 240, the pixel value of the inversely processed pixel point becomes 115.

It should be noted that, since when the image to be processed is fused according to the mask map, the extent to which the image of an area in the image to be processed is changed is positively correlated to the brightness of the corresponding area of the area in the mask map. In some embodiments, the area in the image to be processed corresponding to the pure white area in the mask map is completely changed, and the area in the image to be processed corresponding to the pure black area in the mask map is not changed. If the human face image is processed according to the reference grayscale image so that the human face image retains the lying silkworm, it is required to retain the portion with higher brightness in the area where the lying silkworm is actually located, and thus it is required that the area corresponding to the portion with higher brightness in the reference grayscale image has a lower brightness, such that the device for processing the human face image can perform the inverse processing on the reference grayscale image to reduce the brightness of the corresponding area of the area where the lying silkworm is actually located in the reference grayscale image. Since the device for processing the human face image directly superimposes the reference mask map and the reference grayscale image, the brightness of the corresponding area of the actual area of the lying silkworm is also relatively low in the obtained lying silkworm mask map.

In step 211, the first target image and the human face image are performed the Alpha fusion by using the lying silkworm mask map to obtain the target human face image.

Because the lying silkworm mask map indicates the actual area where the lying silkworm is located, and the brightness of the corresponding area of the actual area of the lying silkworm in the lying silkworm mask map is relatively low, the obtained target human face image may include the lying silkworm in the human face image. The first target image is a part of the human face image with the under-eye bag removed, and therefore the obtained target human face image does not include the under-eye bag, the under-eye bag in the human face image is removed, and the lying silkworm in the human face image is preserved.

The Alpha fusion is performed on the first target image and the human face image, which can make the boundary between the unprocessed area and the surrounding area more apparent, that is, the lying silkworm can be more clearly displayed in the target human face image.

In the embodiments of the present disclosure, the device for processing the human face image may perform face key point positioning on the human face image to determine an eye contour, and determine an under-eye bag area and a lying silkworm area according to the eye contour. Then, the device for processing the human face image can extract the first image to be processed including the under-eye bag area, and adjust the brightness of the first image to be processed as a whole to remove the under-eye bag to obtain the first auxiliary image. The device for processing the human face image may further acquire an under-eye bag mask map corresponding to the first image to be processed, and fuse the first image to be processed with the first auxiliary image according to the under-eye bag mask map, thereby obtaining a first image to be processed with the under-eye bag removed (i.e., the first target image). The device for processing the human face image may further extract the second image to be processed including the lying silkworm area, obtain a reference mask map according to the second image to be processed, and perform grayscale adjustment on the second image to be processed to obtain a reference grayscale image. Afterwards, the device for processing the human face image may superimpose the reference mask map and the reference gray scale image to obtain a silkworm mask map, and fuse the first target image with the human face image according to the lying silkworm mask map, thereby obtaining a target human face image not including under-eye bags but including the lying silkworm.

As such, in the human face image processing method provided by the embodiments of the present disclosure, the lying silkworm mask map can be obtained according to the second image to be processed including the lying silkworm area, and the lying silkworm mask map is used to fuse the first target image after the under-eye bag removal processing with the human face image to obtain a target human face image. In this way, when the beauty treatment is performed to the human face image, only the under-eye bags are removed, and at the same time, the lying silkworm features of the under-eye bag area are preserved, and the first target image is obtained through Poisson fusion of the first image to be processed and the first auxiliary image. The target human face image is obtained by the Alpha fusion of the first target image and the human face image, so that the under-eye bag area in the target human face image has no apparent boundary with the surrounding area thereof, and the lying silkworm in the target human face image can be more significantly displayed. Therefore, the beauty effect on the human face image is better.

It is noted that the various device components, units, blocks, or portions may have modular configurations, or are composed of discrete components, but nonetheless may be referred to as "modules" in general. In other words, the "modules" or "units" referred to herein may or may not be in modular forms.

Figure 8:
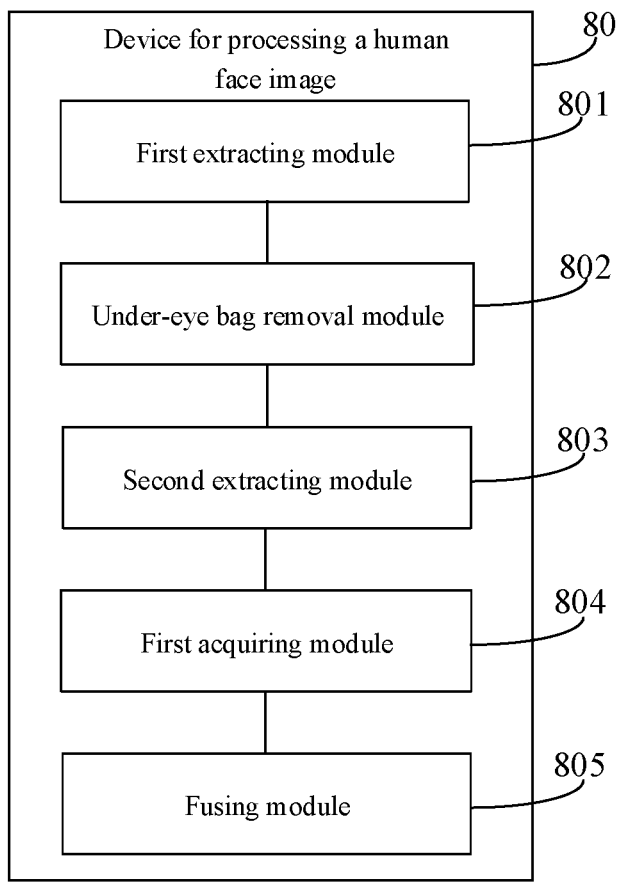
FIG. 8 is a schematic diagram showing a structure of a device for processing a human face image according to some embodiments.

FIG. 8 is a schematic diagram showing a structure of a device for processing a human face image according to some embodiments. As shown in FIG. 8, the device for processing a human face image 80 may include:

a first extracting module 801 configured to extract a first image to be processed comprising an under-eye bag area in the human face image;

an under-eye bag removal module 802 configured to perform under-eye bag removal on the first image to be processed to obtain a first target image;

a second extracting module 803 configured to extract a second image to be processed comprising a lying silkworm area in the human face image;

a first acquiring module 804 configured to acquire a lying silkworm mask map according to the second image to be processed; and a fusing module 805 configured to fuse the first target image with the human face image by using the lying silkworm mask map to obtain a target human face image.

In summary, in the device for processing the human face image provided by the embodiments of the present disclosure, the first acquiring module may obtain the lying silkworm mask map according to the second image to be processed comprising the lying silkworm area, and the fusing module may use the lying silkworm mask map to fuse a first target image after under-eye bag removal processing with the human face image to obtain a target human face image. In this way, when the human face image is subject to beauty treatment, only the under-eye bags are removed, and at the same time, the lying silkworm features of the under-eye bag area are preserved. Therefore, the beauty effect on the human face image is better.

Figure 9:
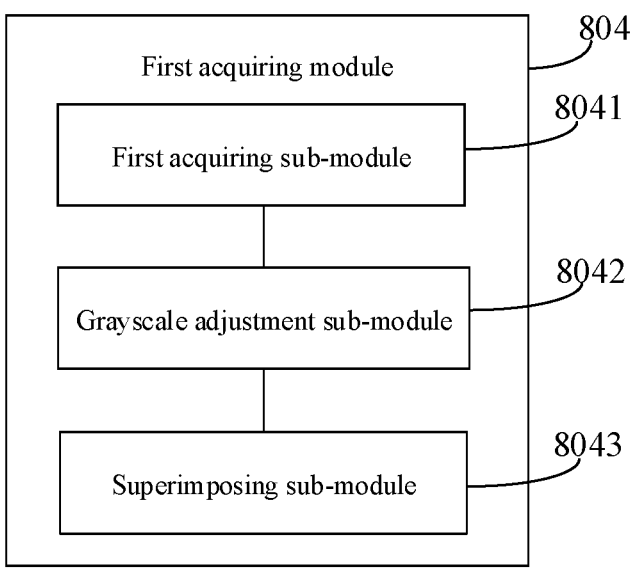
FIG. 9 is a schematic diagram showing a structure of a first acquiring module according to some embodiments.

In some embodiments, FIG. 9 is a schematic diagram showing a structure of a first acquiring module according to an exemplary embodiment. As shown in FIG. 9, the first acquiring module 804 may include:

a first acquiring sub-module 8041 configured to acquire a reference mask map, where the reference mask map is used to indicate a lying silkworm area in the second image to be processed;

a grayscale adjustment sub-module 8042 configured to perform grayscale adjustment on the second image to be processed to obtain a reference grayscale image; and a superimposing sub-module 8043 configured to superimpose the reference mask map and the reference grayscale image to obtain the lying silkworm mask map.

In some embodiments, the grayscale adjustment sub-module 8042 is further configured to:

perform grayscale processing on the second image to be processed;

acquire pixel values of respective pixel points in the second image to be processed after the grayscale processing; and convert the pixel value of each of the respective pixel points by using an s-type function to obtain the reference grayscale image, where the s-type function is:

$$p_{out} = \frac{255}{1+e^t};$$

Herein, $p_{out}$ is the pixel value of the $i^{th}$ pixel point in the reference grayscale image, $$t = \frac{k \times (p_{in} - h)}{255},$$

k is a slope parameter of the s-type function, and the greater the slope parameter is, the steeper the curve corresponding to the s-type function is, $p_{in}$ is the pixel value of the $i^{th}$ pixel point in the second image to be processed after the grayscale processing, 1≤i≤n, n is the total number of the pixel points in the second image to be processed, h is a conversion threshold, and the conversion threshold is used to indicate brightness of the human face image.

Figure 10:
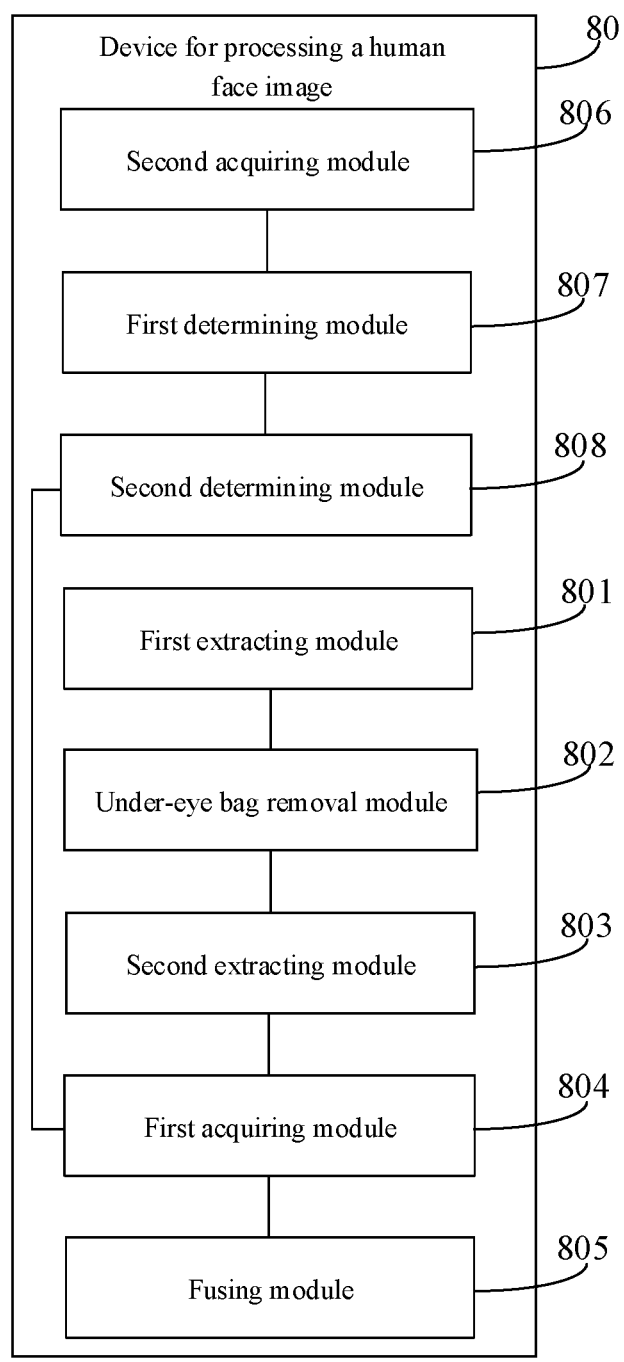
FIG. 10 is a schematic diagram showing a structure of another device for processing a human face according to some embodiments.

In some embodiments, FIG. 10 is a schematic diagram showing a structure of another device for processing a human face according to some embodiments. As shown in FIG. 10, on the base of FIG. 8, the device for processing a human face 80 may further include:

a second acquiring module 806 configured to acquire, in the first image to be processed, a plurality of brightness values of a plurality of—sampling pixel points located at an edge of the under-eye bag area;

a first determining module 807 configured to determine, according to a plurality of brightness values, an average brightness value of a plurality of sampling pixel points; and a second determining module 808 configured to determine the average brightness value as the conversion threshold.

Figure 11:
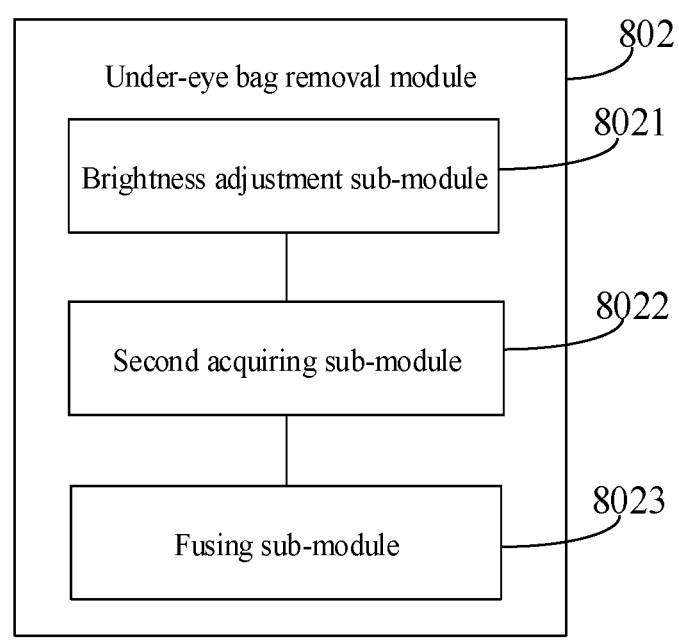
FIG. 11 is a schematic diagram showing a structure of an under-eye bag removal module according to some embodiments.

In some embodiments, FIG. 11 is a schematic diagram showing a structure of an under-eye bag removal module according to some embodiments. As shown in FIG. 11, the under-eye bag removal module 802 may include:

a brightness adjustment sub-module 8021 configured to perform brightness adjustment on the first image to be processed to obtain a first auxiliary image;

a second acquiring sub-module 8022 configured to acquire an under-eye bag mask map corresponding to the first image to be processed, wherein the under-eye bag mask map is used to indicate the under-eye bag area in the first image to be processed; and a fusing sub-module 8023 configured to fuse the first image to be processed with the first auxiliary image according to the under-eye bag mask map to obtain the first target image.

Figure 12:
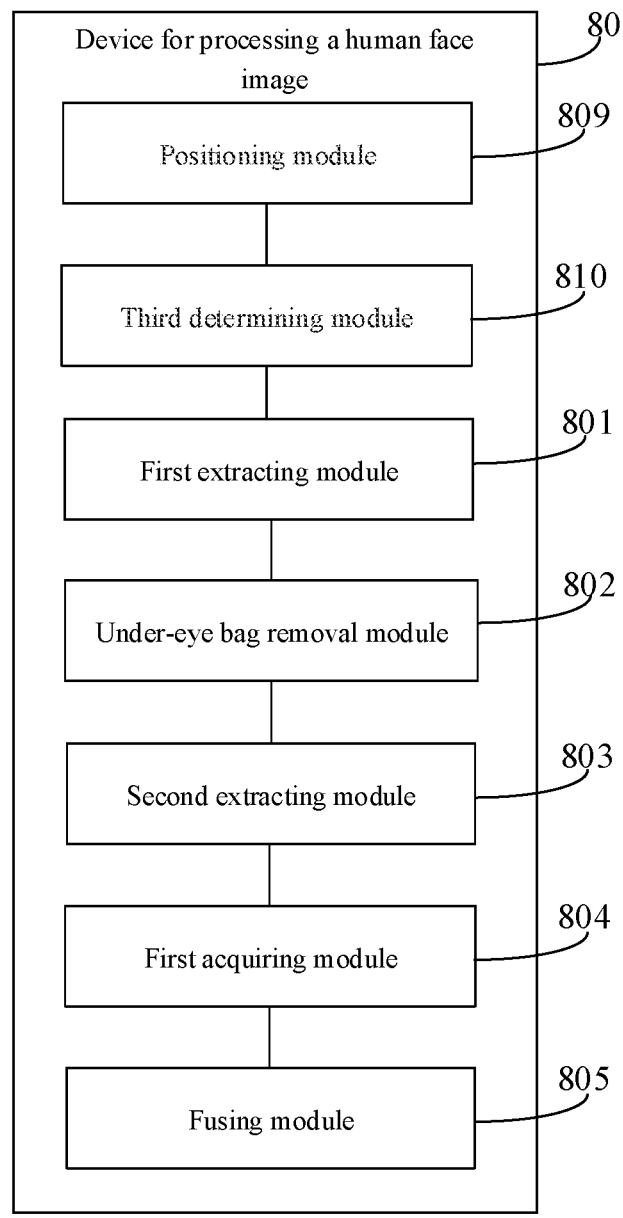
FIG. 12 is a schematic diagram showing a structure of yet another device for processing a human face according to some embodiments.

In some embodiments, FIG. 12 is a schematic diagram showing a structure of yet another device for processing a human face according to some embodiments. As shown in FIG. 12, on the base of FIG. 8, the device for processing a human face 80 may further include:

a positioning module 809 configured to perform face key point positioning on the human face image, and determining an eye contour in the human face image, the eye contour comprising an upper eyelid line and a lower eyelid line; and a third determining module 810 configured to determine a preset area on a side of the lower eyelid line, in the human face image, away from the upper eyelid line as the under-eye bag area, the lower eyelid line being located at an edge of the under-eye bag area.

In some embodiments, the brightness adjustment sub-module 8021 is further configured to:

perform the brightness adjustment on the first image to be processed according to at least one mode of a contrast adjustment mode, an optional color mode, and a soft light processing mode; and the fusing sub-module 8023 is further configured to: perform Poisson fusion on the first image to be processed and the first auxiliary image.

In some embodiments, the fusing module 805 is further configured to: perform Alpha fusion on the first target image and the human face image.

Therefore, in the device for processing the human face image provided by the embodiments of the present disclosure, the first acquiring module may obtain the lying silkworm mask map according to the second image to be processed comprising the lying silkworm area, and the fusing module may use the lying silkworm mask map to fuse the first target image after under-eye bag removal processing with the human face image to obtain a target human face image. In this way, when the human face image is subject to beauty treatment, only the under-eye bags are removed, and at the same time, the lying silkworm features of the under-eye bag area are preserved. Therefore, the beauty effect on the human face image is better.

Figure 13:
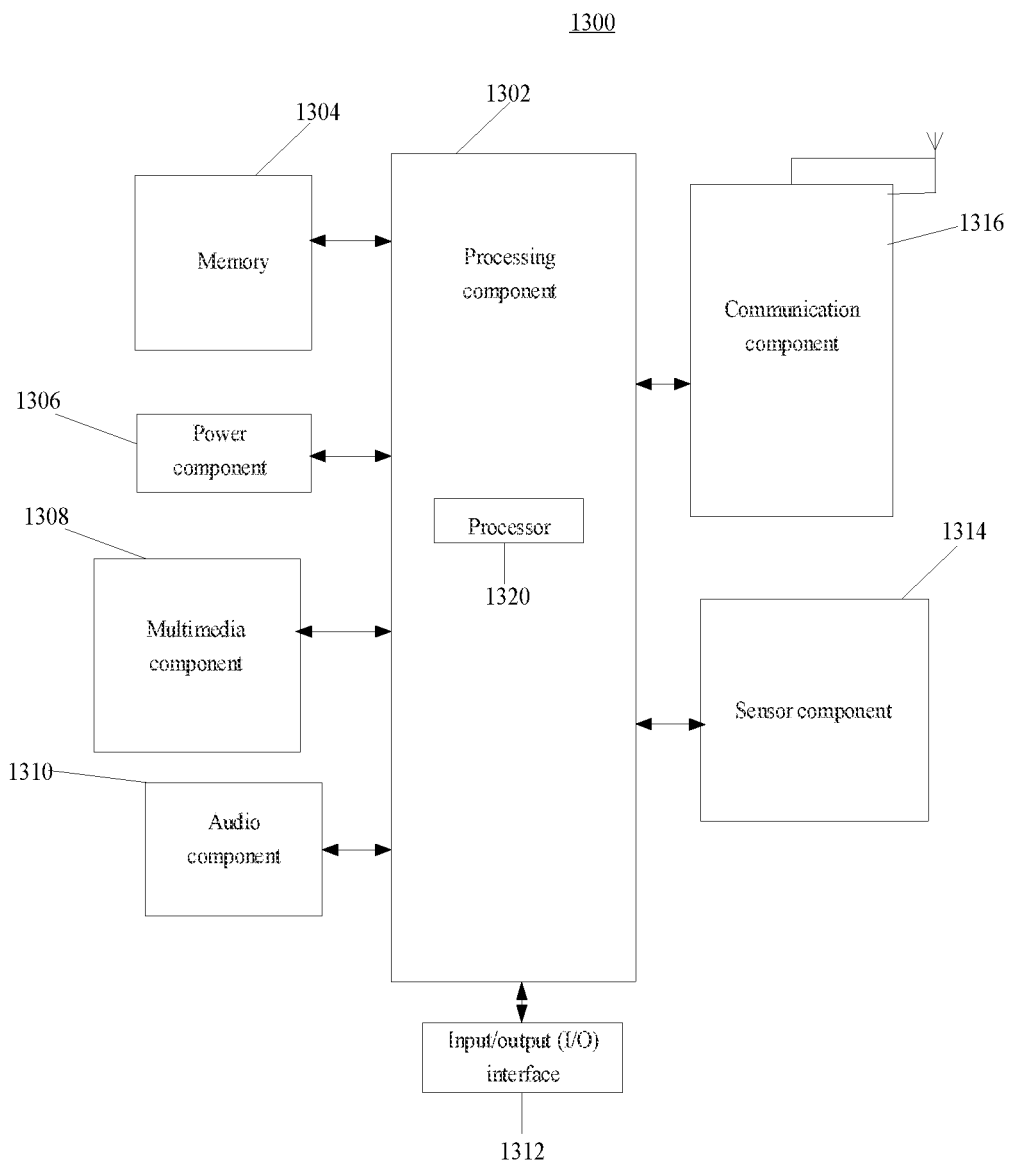
FIG. 13 is a block diagram showing an apparatus for processing a human face according to some embodiments.

FIG. 13 is a block diagram showing an apparatus 1300 for processing a human face according to some embodiments. In an example, the apparatus 1300 may be a mobile phone, a computer, a digital broadcast terminal, a messaging device, a gaming console, a tablet device, a medical device, a fitness equipment, a personal digital assistant, and the like.

Referring to FIG. 13, the apparatus 1300 may include one or more of the following components: a processing component 1302, a memory 1304, a power component 1306, a multimedia component 1308, an audio component 1310, an input/output (I/O) interface 1312, a sensor component 1314, and a communication component 1316.

The processing component 1302 typically controls the overall operations of the apparatus 1300, such as the operations associated with display, telephone calls, data communications, camera operations, and recording operations. The processing component 1302 may include one or more processors 1320 to execute instructions to perform all or part of the steps in the above described methods. Moreover, the processing component 1302 may include one or more modules which facilitate the interaction between the processing component 1302 and other components. For instance, the processing component 1302 may include a multimedia module to facilitate the interaction between the multimedia component 1308 and the processing component 1302.

The memory 1304 is configured to store various types of data to support the operation of the apparatus 1300. Examples of such data include instructions for any applications or methods operated on the apparatus 1300, contact data, phonebook data, messages, pictures, videos, etc. The memory 1304 may be implemented by using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1306 provides power to various components of the apparatus 1300. The power component 1306 may include a power management system, one or more power sources, and any other components associated with the generation, management, and distribution of power in the apparatus 1300.

The multimedia component 1308 includes a screen providing an output interface between the apparatus 1300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 1308 includes a front camera and/or a rear camera. The front camera and the rear camera may receive external multimedia data while the apparatus 1300 is in an operation mode, such as a photographing mode or a video mode. Each of the front camera and the rear camera may be a fixed optical lens system or have focus and optical zoom capability.

The audio component 1310 is configured to output and/or input audio signals. In some embodiments, the audio component 1310 includes a microphone (MIC) configured to receive external audio signals when the apparatus 1300 is in an operation mode, such as a call mode, a recording mode, and a voice recognition mode. The received audio signal may be further stored in the memory 1304 or transmitted via the communication component 1316. In some embodiments, the audio component 1310 further includes a speaker for outputting audio signals.

The I/O interface 1312 provides an interface between the processing component 1302 and peripheral interface modules, such as a keyboard, a click wheel, buttons, and the like. The buttons may include, but are not limited to, a home button, a volume button, a start button, and a lock button.

The sensor component 1314 includes one or more sensors to provide status assessments of various aspects of the apparatus 1300. For instance, the sensor component 1314 may detect an on/off status of the apparatus 1300, relative positioning of components, e.g., the display device and the mini keyboard of the apparatus 1300, and the sensor component 1314 may also detect a position change of the apparatus 1300 or a component of the apparatus 1300, presence or absence of user contact with the apparatus 1300, orientation or acceleration/deceleration of the apparatus 1300, and temperature change of the apparatus 1300. The sensor component 1314 may include a proximity sensor configured to detect the presence of nearby objects without any physical contact. The sensor component 1314 may also include a light sensor, such as a CMOS or CCD image sensor, used for imaging applications. In some embodiments, the sensor component 1314 may also include an accelerometer sensor, a gyroscope sensor, a magnetic sensor, a pressure sensor, or a temperature sensor.

The communication component 1316 is configured to facilitate communication, wired or wirelessly, between the apparatus 1300 and other devices. The apparatus 1300 can access a wireless network based on a communication standard, such as WiFi, 2G, or 3G, or a combination thereof. In some embodiments, the communication component 1316 receives broadcast signals or broadcast associated information from an external broadcast management system via a broadcast channel. In some embodiments, the communication component 1316 further includes a near field communication (NFC) module to facilitate short-range communications. In an example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the apparatus 1300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, a non-transitory computer-readable storage medium including instructions is also provided, such as—the memory 1304 including instructions, executable by the processor 1320 in the apparatus 1300, for performing the above-described methods. For example, the non-transitory computer-readable storage medium may be a ROM, a RAM, a CD-ROM, a magnetic tape, a floppy disc, an optical data storage device, and the like.

All or part of the the embodiments shown in FIG. 1 and FIG. 2 may be implemented through software, hardware, firmware or any combination thereof. When it is implemented in software, all or part of the embodiments may be implemented in the form of a program product that includes one or more instructions. When the instructions are uploaded and executed by a processing component, the processes or functions described in the embodiments of the present disclosure will be generated in all or part.

In another aspect, a mobile terminal is provided including the device described above, and further including a microphone and a speaker.

In some embodiments, the mobile terminal is a mobile phone.

In some embodiments, the processor is a general-purpose processor, such as central processing unit (CPU) of the mobile phone, which is configured to not only realize the methods described above but also run programs or applications (Apps) on the mobile phone, such as browsing, gaming, video/textual/voice communications, etc.

In some other embodiments, the processor is an ASIC described above.

In some embodiments, the human face image processing device is integrated with the mobile phone; in some other embodiments, the device can be a plug-and-play device for the mobile phone, and can access and be controlled by the programs/apps/instructions stored on the phone. In some implementations, the device can draw power from the phone. In some other implementations, the device can have its own battery.

In some embodiments, the mobile phone further includes a micro-electro-mechanical systems (MEMS) motion sensor configured to sense an attitude of the mobile phone, for example the angle and position of the mobile phone as held by the user. The camera(s) of the mobile phone can be used to take images of the user face, or faces other persons, at different angles and positions. The face image processing can then take into account of the angle and position of the mobile phone, and adjust the algorithm described above accordingly.

At least some of the embodiments of the present disclosure can have one or more of the following advantages: in the human face image processing method, the lying silkworm mask map can be obtained according to the second image to be processed which includes the lying silkworm area, and the lying silkworm mask map is used to fuse the first target image after the under-eye bag removal processing with the human face image to obtain a target human face image. The first target image is obtained through Poisson fusion of the first image to be processed and the first auxiliary image, and the target human face image is obtained by Alpha fusing the first target image and the human face image. As such, the under-eye bag area in the target human face image has no obvious boundary with the surrounding area, and the lying silkworm in the target human face image can be more clearly displayed. Therefore, the beauty effect on the human face image is improved.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counterclockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the devices can be controlled remotely through the Internet, on a smart phone, a tablet computer or other types of computers, with a web-based graphic user interface (GUI).

A computer program (also known as a program, software, software application, app, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In an example, a user can speak commands to the human face image processing device.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

In some embodiments, a touch screen (not shown) is included on the human face image processing device allowing user input to control the device directly.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A method for processing a face image, the method comprising:
   extracting a first image to be processed which includes an under-eye bag area in the face image;
   performing under-eye bag removal on the first image to be processed to obtain a first target image;
   extracting a second image to be processed which includes a lying silkworm area in the face image;
   acquiring a lying silkworm mask map according to the second image to be processed; and
   fusing the first target image with the face image by using the lying silkworm mask map to obtain a target face image;
   wherein the acquiring the lying silkworm mask map according to the second image to be processed comprises:
   acquiring a reference mask map which is used to indicate the lying silkworm area in the second image to be processed;
   performing grayscale adjustment on the second image to be processed to obtain a reference grayscale image; and
   inverting the reference grayscale image and superimposing the reference mask map and the inversely reference grayscale image to obtain the lying silkworm mask map; and
   wherein an area in the face image corresponding to an area with higher brightness in the lying silkworm mask map is changed to a greater extent, and an area in the face image corresponding to an area with lower brightness in the lying silkworm mask map is changed to a lesser extent or is not changed.

2. The method according to claim 1, wherein performing grayscale adjustment on the second image to be processed to obtain the reference grayscale image comprises:
   performing grayscale processing on the second image to be processed;
   acquiring pixel values of respective pixel points in the second image to be processed after the grayscale processing;
   converting each of said pixel values of each of the respective pixel points by using an s-type function to obtain the reference grayscale image, where the s-type function is:

$$p_{out} = \frac{255}{1+e^{-t}};$$

wherein, $p_{out}$ is a pixel value of the $i^{th}$ pixel point in the reference grayscale image, $$t = \frac{k \times (p_{in} - h)}{255},$$

k is a slope parameter of the s-type function, and the greater the slope parameter is, the steeper the curve corresponding to the s-type function is, $p_{in}$ is a pixel value of the $i^{th}$ pixel point in the second image to be processed after the grayscale processing, $1 \leq i \leq n$, n is the total number of the pixel points in the second image to be processed, h is a conversion threshold which is used to indicate brightness of the face image.

3. The method according to claim 2, further comprising:
   acquiring, in the first image to be processed, a plurality of brightness values of a plurality of sampled pixel points located at an edge of the under-eye bag area;
   determining, according to the plurality of brightness values, an average brightness value of the plurality of sampled pixel points; and
   determining the average brightness value as the conversion threshold.

4. The method according to claim 1, wherein the performing under-eye bag removal on the first image to be processed to obtain the first target image comprises:
   performing brightness adjustment on the first image to be processed to obtain a first auxiliary image;
   acquiring an under-eye bag mask map corresponding to the first image to be processed, the under-eye bag mask map being used to indicate the under-eye bag area in the first image to be processed; and
   fusing the first image to be processed with the first auxiliary image according to the under-eye bag mask map to obtain the first target image.

5. The method according to claim 1, further comprising:
   performing face key point positioning on the face image to determine an eye contour in the face image, the eye contour comprising an upper eyelid line and a lower eyelid line; and
   determining a preset area of the lower eyelid line, in the face image, away from one side of the upper eyelid line as the under-eye bag area, the lower eyelid line being located at an edge of the under-eye bag area.

6. The method according to claim 4, wherein the performing the brightness adjustment on the first image to be processed comprises:
   performing the brightness adjustment on the first image to be processed according to at least one of a contrast adjustment mode, an optional color mode, and a soft light processing mode; and
   fusing the first image to be processed with the first auxiliary image comprises:
   performing Poisson fusion of the first image to be processed and the first auxiliary image.

7. The method according to claim 1, wherein the fusing the first target image with the face image comprises:
   performing Alpha fusion of the first target image and the face image.

8. An apparatus for processing a face image, comprising:
   a processing component; and
   memory for storing instructions executable by the processing component;
   wherein the processing component is configured to:
   extract a first image to be processed which includes an under-eye bag area in the face image;
   perform under-eye bag removal on the first image to be processed to obtain a first target image;
   extract a second image to be processed which includes a lying silkworm area in the face image;
   acquire a lying silkworm mask map according to the second image to be processed; and fuse the first target image with the face image by using the lying silkworm mask map to obtain a target face image;
wherein the processing component is further configured to:
acquire a reference mask map which is used to indicate the lying silkworm area in the second image to be processed;
perform grayscale adjustment on the second image to be processed to obtain a reference grayscale image; and
invert the reference grayscale image and superimpose the inversely reference mask map and the reference grayscale image to obtain the lying silkworm mask map;
wherein an area in the face image corresponding to an area with higher brightness in the lying silkworm mask map is changed to a greater extent, and an area in the face image corresponding to an area with lower brightness in the lying silkworm mask map is changed to a lesser extent or is not changed.

9. The apparatus for processing a face image according to claim 8, wherein the processing component is further configured to:
perform grayscale processing on the second image to be processed;
acquire pixel values of respective pixel points in the second image to be processed after the grayscale processing;
convert each of said pixel values of each of the respective pixel points by using an s-type function to obtain the reference grayscale image, where the s-type function is:

$$p_{out} = \frac{255}{1 + e^{-t}};$$

wherein, $p_{out}$ is a pixel value of the $i^{th}$ pixel point in the reference grayscale image, $$t = \frac{k \times (p_{in} - h)}{255},$$

k is a slope parameter of the s-type function, and the greater the slope parameter is, the steeper the curve corresponding to the s-type function is, $p_{in}$ is a pixel value of the $i^{th}$ pixel point in the second image to be processed after the grayscale processing, $1 \leq i \leq n$, n is the total number of the pixel points in the second image to be processed, h is a conversion threshold which is used to indicate brightness of the face image.

10. The apparatus for processing a face image according to claim 9, wherein the processing component is further configured to:
acquire, in the first image to be processed, a plurality of brightness values of a plurality of sampled pixel points located at an edge of the under-eye bag area;
determine, according to the plurality of brightness values, an average brightness value of the plurality of sampled pixel points; and
determine the average brightness value as the conversion threshold.

11. The apparatus for processing a face image according to claim 8, wherein the processing component is further configured to:
perform brightness adjustment on the first image to be processed to obtain a first auxiliary image;

acquire an under-eye bag mask map corresponding to the first image to be processed, the under-eye bag mask map being used to indicate the under-eye bag area in the first image to be processed; and
fuse the first image to be processed with the first auxiliary image according to the under-eye bag mask map to obtain the first target image.

12. The apparatus for processing a face image according to claim 11, wherein the processing component is further configured to:
perform the brightness adjustment on the first image to be processed according to at least one of a contrast adjustment mode, an optional color mode, and a soft light processing mode; and
fusing the first image to be processed with the first auxiliary image comprises:
perform Poisson fusion of the first image to be processed and the first auxiliary image.

13. The apparatus for processing a face image according to claim 8, wherein the processing component is further configured to:
perform face key point positioning on the face image to determine an eye contour in the face image, the eye contour comprising an upper eyelid line and a lower eyelid line; and
determine a preset area of the lower eyelid line, in the face image, away from one side of the upper eyelid line as the under-eye bag area, the lower eyelid line being located at an edge of the under-eye bag area.

14. The apparatus for processing a face image according to claim 8, wherein the processing component is further configured to:
perform Alpha fusion of the first target image and the face image.

15. A non-transitory computer-readable storage medium having stored therein instructions that, when executed by a processing component, causes the processing component to perform the method for processing a face image comprising:
extracting a first image to be processed which includes an under-eye bag area in the face image;
performing under-eye bag removal on the first image to be processed to obtain a first target image;
extracting a second image to be processed which includes a lying silkworm area in the face image;
acquiring a lying silkworm mask map according to the second image to be processed; and
fusing the first target image with the face image by using the lying silkworm mask map to obtain a target face image;
wherein acquiring the lying silkworm mask map according to the second image to be processed comprises:
acquiring a reference mask map which is used to indicate the lying silkworm area in the second image to be processed;
performing grayscale adjustment on the second image to be processed to obtain a reference grayscale image; and
inverting the reference grayscale image and superimposing the reference mask map and the inversely reference grayscale image to obtain the lying silkworm mask map; and
wherein an area in the face image corresponding to an area with higher brightness in the lying silkworm mask map is changed to a greater extent, and an area in the face image corresponding to an area with lower brightness in the lying silkworm mask map is changed to a lesser extent or is not changed.

16. The non-transitory computer-readable storage medium according to claim 15, wherein performing the grayscale adjustment on the second image to be processed to obtain the reference grayscale image comprises:
   performing grayscale processing on the second image to be processed;
   acquiring pixel values of respective pixel points in the second image to be processed after the grayscale processing;
   converting each of said pixel values of each of the respective pixel points by using an s-type function to obtain the reference grayscale image, where the s-type function is:

$$p_{out} = \frac{255}{1+e^{-t}};$$

wherein, $p_{out}$ is a pixel value of the $i^{th}$ pixel point in the reference grayscale image, $$t = \frac{k \times (p_{in} - h)}{255},$$

k is a slope parameter of the s-type function, and the greater the slope parameter is, the steeper the curve corresponding to the s-type function is, $p_{in}$ is a pixel value of the $i^{th}$ pixel point in the second image to be processed after the grayscale processing, $1 \leq i \leq n$, n is the total number of the pixel points in the second image to be processed, h is a conversion threshold which is used to indicate brightness of the face image.

17. The non-transitory computer-readable storage medium according to claim 16, wherein the method further comprises:
   acquiring, in the first image to be processed, a plurality of brightness values of a plurality of sampled pixel points located at an edge of the under-eye bag area;
   determining, according to the plurality of brightness values, an average brightness value of the plurality of sampled pixel points; and
   determining the average brightness value as the conversion threshold.

* * * * *